(12) United States Patent
Iroaga (10) Patent No.: US 6,549,357 B1
(45) Date of Patent: Apr. 15, 2003

(54) SELECTABLE INPUT POLE COMPENSATION FOR A DISK DRIVE READ HEAD

(75) Inventor: Echere Iroaga, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/513,393

(22) Filed: Feb. 25, 2000

(51) Int. Cl.[7] .................................................. G11B 5/09

(52) U.S. Cl. ........................................... 360/67; 360/46

(58) Field of Search ............................. 360/46, 65, 67; 330/252, 261

(56) References Cited

U.S. PATENT DOCUMENTS 6,236,524 B1 * 5/2001 Gregoire et al. ............ 330/261

* cited by examiner

Primary Examiner—Regina N. Holder
Assistant Examiner—Varsha A. Kapadia
(74) Attorney, Agent, or Firm—Bret J. Petersen; W. James Brady; Frederick J. Telecky, Jr.

(57) ABSTRACT

A selectively adjustable impedance boosting circuit for a magneto-resistive head in a disk drive to compensate a frequency pole by introducing a zero in proportion to the resistance of the magneto-resistive element and with selectable circuit parameters to further adjust the pole compensation. The invention includes selectively adjusting the sensitivity of the pole compensation to changes in the resistance of the head, selectively adjusting the peak compensation, and adjusting the frequency of the compensating zero.

14 Claims, 5 Drawing Sheets

SELECTABLE INPUT POLE COMPENSATION FOR A DISK DRIVE READ HEAD

TECHNICAL FIELD OF THE INVENTION

This invention relates generally to the field of information storage, and more particularly to a method and apparatus for increasing the bandwidth of a differential amplifier for a disk drive read head.

BACKGROUND OF THE INVENTION

In general, mass storage devices, such as hard disk drives, include a magnetic storage media, such as rotating disks or platters, a spindle motor, read/write heads, an actuator, a pre-amplifier, a read channel, a write channel, a servo circuit, and control circuitry to control the operation of the hard disk drive and to properly interface the hard disk drive to a host system or bus.

Figure 1:
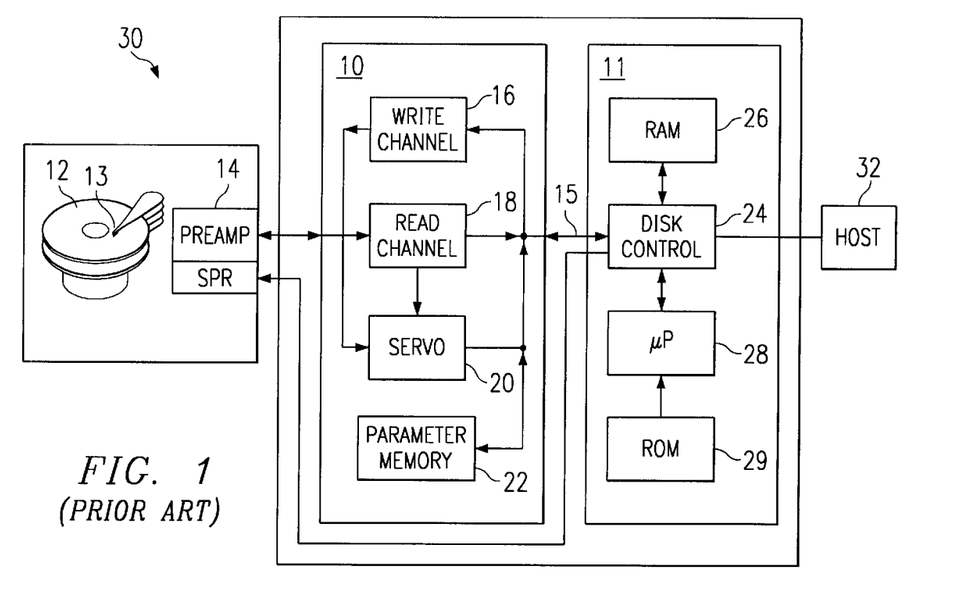
FIG. 1 is a block diagram illustrating an exemplary disk drive mass storage system.

FIG. 1 provides one example of a prior art disk drive mass storage system 30. Disk drive system 30 interfaces and exchanges data with a host 32 during read and write operations. Disk drive system 30 includes a disk/head assembly 12, a preamplifier 14, a synchronously sampled data (SSD) channel 10, and a control circuit 11. Disk/head assembly 12 and preamplifier 14 are used to magnetically store data. SSD channel 10 and control circuitry 11 are used to process data that is being read from and written to disk/head assembly 12 and to control the various operations of disk drive mass storage system 30. Host 32 exchanges digital data with control circuitry 11.

Disk/head assembly 12 includes a number of rotating platters used to store data that is represented as magnetic transitions on the magnetic platters. Read/write heads 13 of disk/head assembly 12 are used to store and retrieve data from each side of the magnetic platters. Read/write heads 13 may comprise any type of available read/write heads such as magneto-resistive heads. Preamplifier 14 serves as an interface between read/write heads 13 of disk/head assembly 12 and SSD channel 10, and provides amplification to the waveform data signals as needed.

SSD channel 10 is used during read and write operations to exchange analog data signals with disk/head assembly 12 through preamplifier 14 and to exchange digital data signals with control circuitry 11 through a data/parameter path 15. SSD channel 10 includes a write channel 16, a read channel 18, a servo control 20, and a parameter memory 22. SSD channel 10 may be implemented as a single integrated circuit.

Some of the various circuit modules of read channel 18 may receive operational parameters for enhanced or optimal performance. The operational parameters are generally calculated during burn-in but may be calculated at other times. The operational parameters are designed to account for the various physical and magnetic characteristics of disk drive mass storage system 30 that vary from system to system and influence operational performance. During start-up, the operational parameters are provided to SSD channel 10 from control circuitry 11 through data/parameter path 15. Parameter memory 22 stores the operational parameters. The various circuit modules of read channel 18 may then access the operational parameters from parameter memory 22 during read operations.

Control circuitry 11 controls the various operations of disk drive mass storage system 30 and to exchange digital data with SSD channel 10, the pre-amp 14 and host 32. Control circuitry 11 includes a microprocessor 28, a disk control 24, a random access memory (RAM) 26, and a read only memory (ROM) 29. Microprocessor 28, disk control 24, RAM 26, and ROM 29 together provide control and logic functions to disk drive mass storage system 30 so that data may be received from host 32, stored, and later retrieved and provided back to host 32. ROM 29 includes preloaded microprocessor instructions for use by microprocessor 28 in operating and controlling disk drive mass storage system 30. ROM 29 may also include the operational parameters, discussed above, that are supplied to parameter memory 22 during start-up. RAM 26 is used for storing digital data received from host 32 before being supplied to SSD channel 10 and received from SSD channel 10 before being supplied to host 32. RAM 26 may also provide data to microprocessor 28 and store data or results calculated by microprocessor 28. Disk control 24 includes various logic and bus arbitration circuitry used in properly interfacing disk drive mass storage system 30 to host 32 and for internally interfacing control circuitry 11 to SSD channel 10 and to the pre-amp status register in pre-amp 14. Depending on the circuit implementation, any of a variety of circuitry may be used in disk control 24.

In operation, disk drive mass storage system 30 goes through an initialization or start-up routine when power is initially provided. One such routine instructs microprocessor 28 to supply operational parameters, previously stored in ROM 29, to parameter memory 22 of SSD channel 10 through data/parameter path 15. The operational parameters are then stored in memory registers of parameter memory 22 for use by read channel 18 during a read operation. Operational parameters may also be stored in the pre-amp status register in pre-amp 14 using bus 15b.

During read operations, read channel 18 receives analog data signals from read/write heads 13 of disk/head assembly 12 through preamplifier 14. Read channel 18 conditions, decodes, and formats the analog data signal and provides a digital data signal in parallel format to control circuitry 11 through data/parameter path 15. Read channel 18 includes any of a variety of circuit modules such as an automatic gain control circuit, a low pass filter, a variable frequency oscillator, a sampler, an equalizer, such as a finite impulse response filter, a maximum likelihood, partial response detector, a deserializer, and a synchronization field detection circuit. Read channel 18 provides the digital data signal to disk control 24 through data/parameter path 15. Disk control 24 provides various digital logic control and arbitration circuitry between SSD channel 10, host 32, RAM 26, microprocessor 28, and ROM 29 during both read and write operations.

The bandwidth of the system is typically limited by the lead inductance associated with the magneto-resistive read/write head. The limited bandwidth is attributable to a pole caused by the combination of the resistance and lead inductance of the magneto-resistive read/write head, which causes a roll off in the system's frequency response.

One approach to increasing the bandwidth of a hard disk drive is to introduce a zero at a frequency corresponding to the pole due to the lead inductance of the magneto-resistive element. One method of locating such a compensating zero was introduced in a prior application, U.S. application Ser. No. 09/211,938 filed Dec. 15, 1998 by Bernard R. Gregoire et. al. In that application, an adjustable impedance boosting circuit was described that improved over the prior techniques by providing an adjustable compensating zero. That invention had several important technical advantages. Varying the impedance of the variable impedance load in proportion to the actual value of the magneto-resistive element facilitates adjustable compensation for a pole caused by the lead inductance of the magneto-resistive element. This prior invention provided a method and apparatus for approximating a compensating zero that is responsive to variations in the actual value of the magneto-resistive element. The peak-limiting circuit prevents peaks in the frequency response by rolling off the gain of the variable impedance load at a selected frequency.

SUMMARY OF THE INVENTION

While the previously described prior invention provided an adjustable impedance boosting circuit that adjusted a compensating zero for variations in the actual value of the magneto-resistive element for a given head, it is desirable to further adjust the response of the impedance boosting circuit. Adjusting the impedance response is needed to allow further bandwidth improvement despite variations in the head resistance. Also, adjustment of the impedance boosting circuit through the status register allows optimization of the boosting circuit and compensation for variations in the lead inductance values which may vary drive to drive as well as compensating for process variations after chip fabrication.

A selectively adjustable impedance boosting circuit for a magneto-resistive head in a disk drive is introduced in the present invention to compensate a frequency pole by introducing a zero in proportion to the resistance of the magneto-resistive element and with selectable circuit parameters to further adjust the pole compensation. Embodiments of the present invention include selectively adjusting one or more of the following parameters: the sensitivity of the pole compensation to changes in the resistance of the head, the peak compensation, and the frequency of the compensating zero.

BRIEF DESCRIPTION OF THE DRAWINGS

A more complete understanding of the teachings of the present invention may be acquired by referring to the accompanying figures in which like reference numbers indicate like features and wherein.

DETAILED DESCRIPTION OF THE INVENTION

The below description of the prior art circuit, along with FIGS. 2–4, demonstrate how to cancel the input pole of the frequency response of the head read circuit. Basically, the compensation is done by controlling the gain of a variable impedance load with a current source which is sensitive to the resistance of the head. Subsequent paragraphs describe improvements to this circuit according to the present invention. These improvements include: controlling peaking in the frequency response, adjustable sensitivity of the pole cancellation to the $R_{MR}$ value, adjusting the frequency of the compensation zero, level shifting to improve head room, and a degenerated input stage to improve input swing capability.

Figure 2:
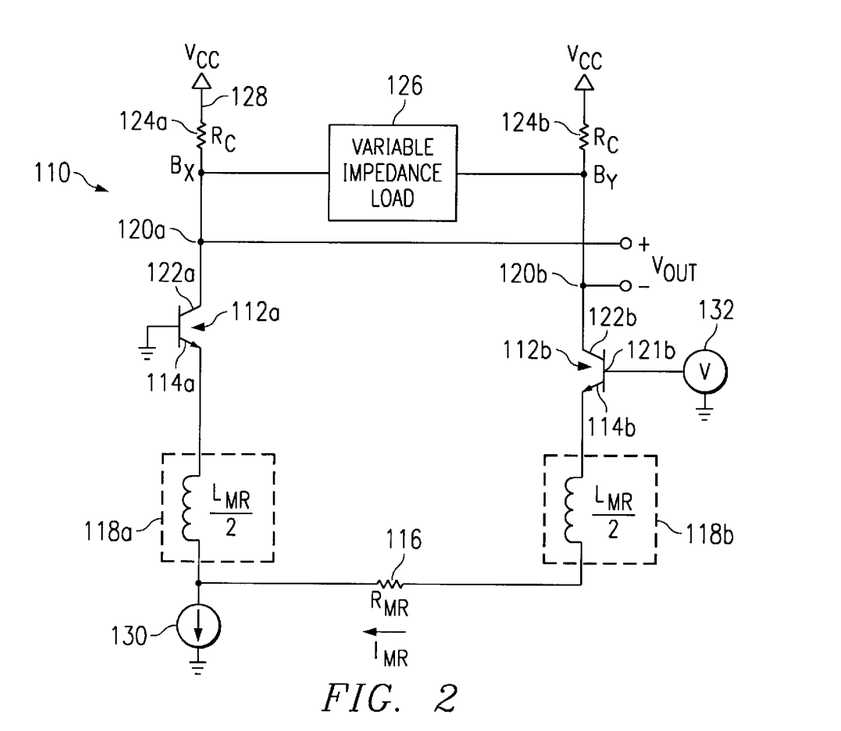
FIG. 2 is a schematic diagram of an adjustable impedance boosting circuit constructed according to the teachings of the prior art.

FIG. 2 is a schematic diagram of an adjustable impedance boosting circuit 110 constructed according to the teachings of the prior art described above. Adjustable impedance boosting circuit 110 may comprise a portion of preamplifier circuit 14 of FIG. 1. Adjustable impedance boosting circuit 110 may include a differential pair of gain stage transistors 112a and 112b. Gain stage transistors 112a–112b may comprise, for example, n-p-n bipolar junction transistors. Other types transistors may, however, be used without departing from the scope of the invention. A magneto-resistive element 116 may be coupled between emitters 114a and 114b of transistors 112a–112b, respectively. Magneto-resistive element 116 may comprise, for example, a read/write head of a hard disk drive. Inductance elements 118a and 118b represent magneto-resistive lead inductances associated with magneto-resistive element 116. Lead inductance elements 118a–118b, thus, are not inductors placed deliberately in circuit 110, but rather are representative of the magneto-resistive lead inductance in the circuit.

Impedance boosting circuit 110 may comprise output nodes 120a and 120b coupled to the collectors 122a–122b of transistors 112a–112b, respectively. An output signal $V_{OUT}$ may propagate from output nodes 120a–120b. Output signal, $V_{OUT}$, comprises an amplified version of an input signal to the differential pair of transistors 112a–112b, amplified by a gain factor, A. Gain factor, A, is determined by the ratio of the impedance at collectors 122a–122b of transistors 112a–112b to the impedance at the emitters 114a–114b. Collector loads 124a–124b may be coupled to collectors 122a–122b of transistors 112a–112b, respectively. In this embodiment, collector loads 124a–124b comprise resistors coupled to collectors 122a–122b of transistors 112a–112b, respectively. Alternatively, collector loads 124a–124b may comprise any combination of elements in various configurations collectively forming a collector load element.

A variable impedance load 126 may be coupled in parallel with collector loads 124a–124b at nodes $B_X$ and $B_Y$. Variable impedance load 126 may, for example, be coupled to the collector-side of collector load 124, as shown in FIG. 2. Variable impedance load 126 need not reside entirely between nodes $B_x$ and $B_y$. In another embodiment (not explicitly shown), at least a portion of variable impedance load 126 may be coupled between node Bx and the power supply, and at least a portion may be coupled between node By and the power supply. In still another embodiment, where collector loads 124a–124b comprise combinations of resistors (not explicitly shown), variable impedance load 126 may be coupled between individual elements of collector loads 124a–124b. Any combination of variable impedance load 126 coupled in parallel with at least a portion of collector loads 124a–124b may be used without departing from the scope of the invention.

Transistors 112a–112b may be biased with a current source 130 coupled to emitter 114a of transistor 112a, and a voltage source 132 coupled to base 121b of transistor 112b. The magnitude of voltage source 132, may be chosen, for example, to provide equal currents through transistors 112a and 112b. Other biasing schemes may be used without departing from the scope of the invention. For example, a separate current source may be coupled to each emitter 114a and 114b on either side of magneto-resistive element 116 (not explicitly shown). In that case, base 121b of transistor 112b may be coupled to ground.

As described above, magneto-resistive element 116 may comprise a portion of a read/write head in a hard disk drive. In operation, magneto-resistive element 116 may sense changes in the magnetic field as the read/write head reads data from the disk platter. As the magnetic field changes, the resistance of magneto-resistive element 116 also changes. The gain factor, A, of differential pair of transistors 112a–112b, is determined by the ratio of the impedance at the collectors 122a–122b to the impedance at the emitters 114a–114b. Changes in the resistance of magneto-resistive element 116 due to fluctuations in the magnetic field cause corresponding changes in gain factor A and, thus, output voltage $V_{OUT}$ of the differential pair.

Magneto-resistive element 116 has a lead inductance $L_{MR}$ associated with it. The combination of magneto-resistive element 116 and its lead inductance 118a–118b creates a pole in the frequency response of the system, limiting the bandwidth of the device. It is often desirable to increase the bandwidth of the system by implementing circuitry operable to create a zero in the frequency response of the system to counteract the pole caused by the lead inductance of magneto-resistive element 116. Typical magneto-resistive elements 116 may exhibit tolerances of up to 30%, which result in corresponding variances in the location of the pole caused by the lead inductance of magneto-resistive element 116. In addition, the actual value of magneto-resistive element 116 may vary with the operating temperature of the device. Because the locations of the lead inductance pole vary with actual values of magneto-resistive elements, typical static compensation schemes often fail to provide effective compensation. It is, therefore, desirable that the circuitry for approximating the compensating zero be operable to adjust the characteristics of the approximated compensating zero in response to variations in tolerance levels of the magneto-resistive elements.

Variable impedance load 126 operates to approximate an adjustable compensating zero to offset the pole created by the lead inductance of magneto-resistive element 116. The characteristics of the approximated compensating zero may be specifically tailored depending on actual magneto-resistive value. The frequency at which the approximated compensating zero occurs may be determined by selection of component values within variable impedance load 126 or selectable through the status register according to an embodiment of the present invention. The magnitude of the compensating gain introduced by variable impedance load 126 may be controlled by adjusting the impedance of variable impedance load 126 in proportion to the actual value of the resistance of magneto-resistive element 116. Variable impedance load 126 may comprise any circuitry operable to vary its impedance in proportion to the actual value of the resistance of magneto-resistive element 116. For example, variable impedance load 126 may comprise circuitry operable to create a negative impedance at nodes $B_X$ and $B_Y$, to effect an overall increase in the impedance of the parallel combination of collector load 124 and variable impedance load 126. Specific details of the structure and function of variable impedance load 126 will be described later in this document.

Figure 3:
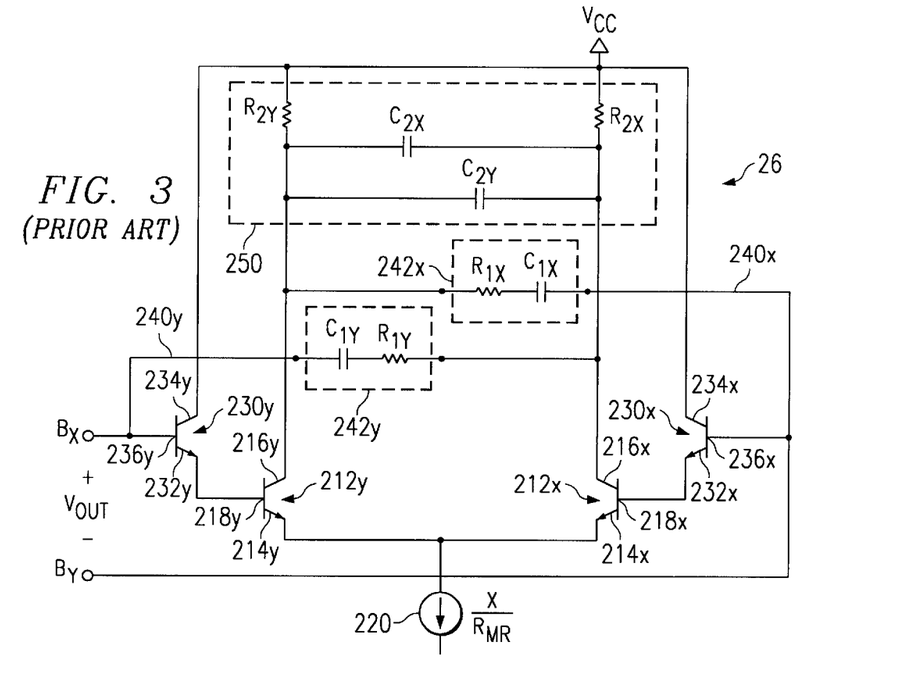
FIG. 3 is a schematic diagram of a variable impedance load circuit constructed according to the teachings of the prior art.

FIG. 3 is a schematic diagram of variable impedance load 126 constructed according to the teachings of the prior art invention. Variable impedance load 126 may include a first differential pair of transistors 212x–212y having emitters 214x–214y coupled to an impedance-controlling current source 220. Variable impedance load 126 may further include a second differential pair of transistors 230x–230y having emitters 232x–232y coupled to bases 218x–218y of transistors 212x–212y, respectively. Collectors 216x–216y of differential pair 212x–212y are coupled through resistors $R_{2x}$ and $R_{2y}$ to supply voltage $V_{CC}$. Also, collectors 234x–234y of differential pair and 230x–230y may be coupled to supply voltage $V_{CC}$.

A positive feedback network 240x may be coupled between base 236x of transistor 230x and collector 216y of transistor 212y. Similarly, a positive feedback network 240y may be coupled between base 236y of transistor 230y and collector 216x of transistor 212x. Positive feedback networks 240x–240y may include first positive feedback element 242x and second positive feedback element 242y, respectively. First and second positive feedback elements 242x–242y may comprise, for example, a resistor/capacitor network. Specifically, first and second positive feedback elements 242x–242y may comprise resistors $R_{1x}$ and $R_{1y}$ coupled in series with capacitors $C_{1x}$ and $C_{1y}$, respectively. As will be described below, particular values of components within positive feedback networks 240x–240y may be selected to achieve particular characteristics in the frequency response of variable impedance load 126.

Variable impedance load circuit 126 may further include a peak-limiting circuit 250 coupled to collectors 216x–216y of transistors 212x–212y and collectors 234x–234y of transistors 230x–230y, respectively. Peak-limiting circuit 250 may comprise any circuit operable to create a pole in the frequency response of variable impedance load circuit 126 at a selected frequency. In one embodiment, peak-limiting circuit 250 may comprise capacitors $C_{2X}$ and $C_{2Y}$, coupled in parallel between collectors 216x and 216y of transistors 212x and 212y, respectively. Peak-limiting circuit 250 may further comprise resistors $R_{2X}$ and $R_{2Y}$, coupled between capacitor $C_{2X}$ and collectors 234x–234y of transistors 230x–230y, respectively.

An impedance controlling current source 220 may be coupled to bases 214x–214y of transistors 212x–212y, respectively. Impedance controlling current source 220 may comprise voltage-sensing circuitry (not explicitly shown) operable to determine the voltage, $V_{MR}$, across magneto-resistive element 116. The voltage $V_{MR}$ may be determined, for example, by observing the differential voltage at bases 121a–121b of transistors 112a–112b, respectively (FIG. 1). Impedance controlling current source circuitry 220 may further include current-sensing circuitry operable to determine the current $I_{MR}$ through magneto-resistive element 116. Current-sensing circuitry (not explicitly shown) may include a current mirror coupled in parallel with current source 130. Any circuitry operable to sense the current through magneto-resistive element 116 may be used without departing from the scope of the invention.

Impedance controlling current source circuitry 220 may still further include-current-generating circuitry operable to generate a current signal $X/R_{MR}$ which is proportional to the actual value of the resistance of magneto-resistive element 116. Current generating circuitry (not explicitly shown) may comprise, for example, a Gilbert multiplier, which receives voltage $V_{MR}$ from the voltage sensing circuitry and current $I_{MR}$ from the current sensing circuitry. The Gilbert multiplier may multiply voltage $V_{MR}$ by an inverted version of current $I_{MR}$ to produce a signal $X/R_{MR}$, which is proportional to the actual value of the resistance of magneto-resistive element 116. A Gilbert multiplier is only one example of circuitry that may be used to generate a signal proportional to the actual value of the resistance of the magneto-resistive element 116. Other circuits could be used without departing from the scope of the invention.

In operation, variable impedance load circuit 126 operates to approximate a compensating zero in the frequency response of adjustable impedance boosting circuit 110, which compensates for the effects of the pole caused by the lead inductance of magneto-resistive element 116. Variable impedance load 126, therefore, extends the bandwidth of adjustable impedance boosting circuit 110. This provides compensation for magneto-resistive-induced poles, while providing variable compensation levels to account for variations in the actual value of magneto-resistive element 116.

In general, adjustable impedance boosting circuit 110 operates to increase the bandwidth of the system by approximating a compensating zero $Z_{COMPENSATE}$, which is adjustable in proportion to the actual value of the resistance of magneto-resistive element 116. The magnitude of the gain attributable to the approximated compensating zero is controlled by adjustment of the impedance of variable impedance load 126, which is coupled in parallel with collector load 124. By creating a negative impedance at nodes $B_x$ and $B_y$, variable impedance load 126 increases the impedance of the parallel combination, and thus, increases the gain of the differential pair. Varying the magnitude of the negative impedance in proportion to the actual value of the resistance of magneto-resistive element 116 facilitates variable compensation levels. The approximated zero is said to be "approximated," because variable impedance load 126 may introduce a greater increase in the system's frequency response than an actual zero would. To avoid peaks in the resultant system frequency response, a peak-limiting circuit 250 may be coupled to variable impedance load 126. Peak-limiting circuit 250 operates to create a pole at a desired frequency to control the gain provided by variable impedance load 126. Variable impedance load 126 and peak limiting circuit 250 may operate in combination to approximate a compensating zero near the rolloff frequency caused by the lead inductance of the system. Details of peak-limiting circuit 250 will be described below.

Referring to FIG. 3, at very low frequencies, first and second positive feedback elements 242x and 242y act essentially as open circuits, preventing positive feedback between first and second differential pairs 212x–212y and 230x–230y, respectively. At low frequencies, therefore, adjustable impedance boosting circuit 110 sees a positive impedance between nodes $B_x$ and $B_y$. At higher frequencies, capacitors $C_{1X}$ and $C_{1Y}$ begin to allow positive feedback to transistors 230x and 230y, which reduces the impedance seen between nodes $B_x$ and $B_y$. At some frequency, this positive feedback creates a negative impedance between nodes $B_x$ and $B_y$. The point at which the impedance between nodes $B_x$ and $B_y$ becomes negative represents an approximated compensating zero, $Z_{COMPENSATE}$, of the circuit. This point is determined primarily by selection of component values in positive feedback elements 242x–242y.

The frequency of the approximated compensating zero, $Z_{COMPENSATE}$, would ideally be set at the frequency of the pole due to the lead inductance of magneto-resistive element 116. As described above, however, typical magneto-resistive elements may exhibit tolerances of up to 30%. In addition, actual values of magneto-resistive element 116 may fluctuate due to temperature changes. These variations causes corresponding variances in the location of the poles associated with the lead inductance of magneto-resistive element 116. In one embodiment, the frequency of approximated compensating zero $Z_{COMPENSATE}$ may be selected to correspond to an average value of magneto-resistive element 116. This may facilitate placement of approximated compensating zero $Z_{COMPENSATE}$ near the pole caused by the lead inductance of magneto-resistive element 116.

In addition to controlling the placement of the approximated compensating zero, variable impedance load circuit 126 facilitates adjustment of the magnitude of the gain associated with the approximated compensating zero. The magnitude of the compensating gain depends upon the amount of negative impedance seen between nodes $B_X$ and $B_Y$. The larger the negative impedance between nodes $B_X$ and $B_Y$, the larger the impedance of the parallel combination of the collector loads 124 and variable impedance load 126. Larger overall collector impedance corresponds to a larger gain in the differential amplifier of adjustable impedance boosting circuit 110. Thus, by controlling the amount of negative impedance seen between nodes $B_X$ and $B_Y$, variable impedance load circuit 126 may control gain factor, A, of adjustable impedance boosting circuit 110.

The level of negative impedance at nodes $B_X$ and $B_Y$ depends on the transconductance $g_m$ of transformers 212x–212y and 230x–230y. The transconductance depends on the current $X/R_{MR}$ feeding positive feedback paths 240x–240y. As described above, current signal $X/R_{MR}$ may be proportional to the actual value of the resistance of magneto-resistive element 116. Current signal $X/R_{MR}$ may be generated though any appropriate circuitry. In one embodiment, impedance-controlling current source 220 may include, for example, a Gilbert multiplier (not explicitly shown) operable to receive a signal proportional to the voltage, $V_{MR}$, and a signal proportional to the current, $I_{MR}$. The Gilbert multiplier may multiply the signal proportional to voltage $V_{mr}$ by an inverse of a signal proportional to current $I_{MR}$, to generate a signal $X/R_{MR}$ proportional to the actual value of the resistance of magneto-resistive element 116.

To avoid peaks in the frequency response of the system, peak-limiting circuit 250 may be implemented. Peak-limiting circuit 250 may create a pole in the frequency response of the differential amplifier to counteract the effect of the approximated compensating zero at a desire frequency. The specific location of the peak-limiting pole may be controlled through selection of components within peak-limiting circuit 250.

Controlling the impedance, and thus, the gain of variable impedance load 126 through a current source that is proportional to the actual value of the resistance of magneto-resistive element 116 facilitates automatic compensation for various values of magneto-resistive element 116. FIGS. 4a–4d show exemplary frequency responses of compensated and uncompensated systems.

Figure 4A:
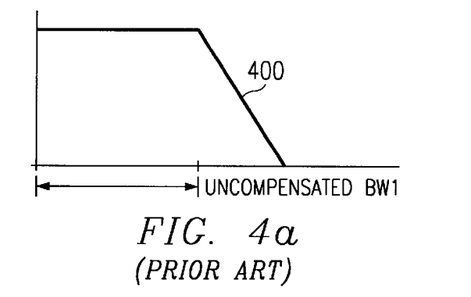
FIG. 4a shows an exemplary frequency response of an exemplary differential amplifier.

FIG. 4a shows an exemplary frequency response of an uncompensated differential amplifier having a bandwidth, $BW_1$.

Figure 4B:
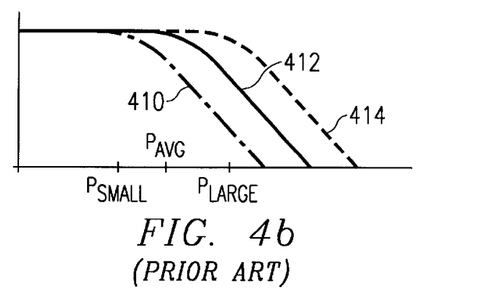
FIG. 4b shows exemplary frequency responses of a differential amplifier having various levels of magneto-resistive components.

FIG. 4b shows exemplary frequency responses of uncompensated differential amplifiers having magneto-resistive elements of various values. For example, frequency response 410 represents an amplifier having a small magneto-resistive component. Frequency response 412 represents an amplifier having a mid-range magneto-resistive component. Frequency response 414 represents an amplifier having a high magneto-resistive component. As shown, the smaller the magneto-resistive component, the sooner frequency rolls off at the lead inductance pole.

Figure 4C:
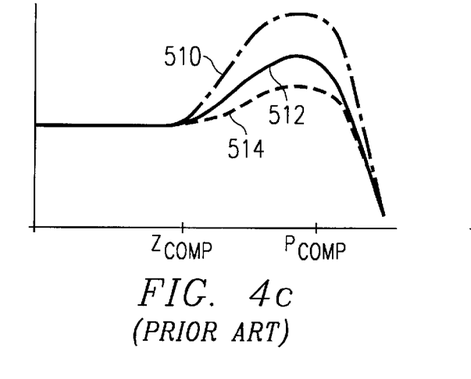
FIG. 4c shows exemplary frequency responses of a variable impedance load circuit constructed according to the teachings of the present invention.
Figure 4D:
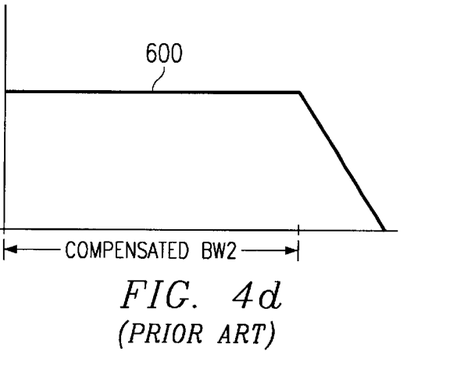
FIG. 4d shows an exemplary frequency response of an exemplary adjustable impedance boosting circuit constructed according to the teachings of the present invention.

FIG. 4c shows exemplary frequency responses of a variable impedance load circuit constructed according to the teachings of the present invention. As described above, an approximated compensating zero, $Z_{COMPENSATE}$, may be introduced at a frequency near the frequency of the lead inductance pole. For example, approximated compensating zero $Z_{COMPENSATE}$ may be placed at a frequency corresponding to the pole associated with an average value of typical magneto-resistive elements. The magnitude of the compensating gain may then be adjusted, depending on the actual value of magneto-resistive element 116, to provide a smooth resulting frequency response shown in FIG. 4d. For example, frequency response 510 depicts a high-magnitude compensating gain necessary to compensate for the early frequency roll off 410 due to a small magneto-resistive component. Frequency response 512 shows a mid-magnitude compensating gain used to compensate for the average frequency roll off 412 caused by an average magneto-resistive component. Frequency response 514 shows a low-magnitude compensating gain for compensating the frequency roll off 412 caused by a higher than average magneto-resistive component. Adjustable impedance boosting circuit 110 provides an increased resultant bandwidth $BW_2$, regardless of variations in the actual values of different magneto-resistive elements.

Figure 5:
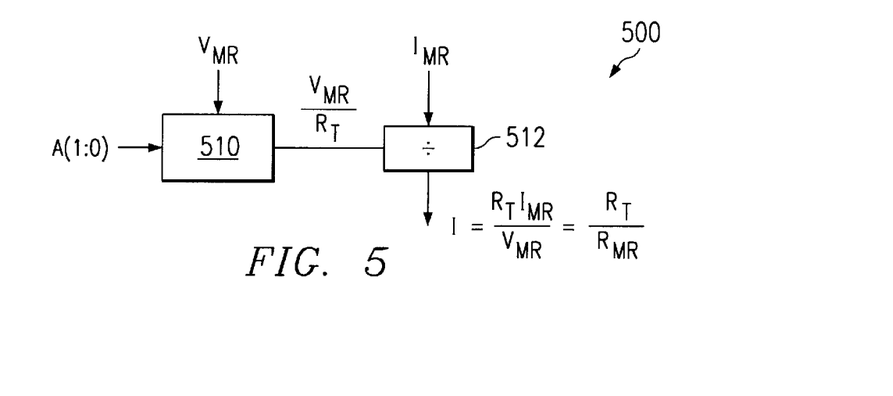
FIG. 5 is a block diagram illustrating a gain sensitivity circuit.

FIG. 5 represents a gain sensitivity circuit according to an embodiment of the present invention. This circuit adds the capability of a selectable sensitivity of the pole cancellation to the Rmr value. The selection is preferably made by setting one or more defined bits in the pre-amp status register 14b described above. The gain sensitivity circuit 500, includes an adjustable sensitivity circuit 510 and a divider circuit 512. The output of the adjustable sensitivity circuit is $V_{MR}$ times a term coefficient represented by $1/R_T$.

The adjustable sensitivity circuit 510 preferably includes select inputs, preferably from the defined bits in the pre-amp status register, along with the head voltage $V_{MR}$, which can be detected as described above. The adjustable sensitivity circuit outputs a voltage proportional to $V_{MR}$ depending on the select bits. In the illustrated embodiment the proportion is shown as $1/R_T$ which will be described below. This output is applied to the divider circuit 512, which has head current $I_{MA}$ as a second input. The divider circuit output is a current $R_T I_{MR}/V_{MR}$. This current can also be represented as $R_T/R_{MR}$. The divider circuit can be implemented as a Gilbert cell or with other known circuits.

The output current $R_T/R_{MA}$ can be used as the current source 22 in FIG. 3. In the prior art, this current source was a fixed value $X/R_{MR}$. Substituting the variable multiplier $R_T$, the circuit then provides a cancellation zero with adjustable sensitivity to the read head resistance $R_{MR}$. Therefore the cancellation zero will have adjustable sensitivity to the head resistance which will help compensate for the variance in the magneto-resistive head characteristics from drive to drive. The sensitivity can be used to optimized drive performance and would most commonly be done during the disk drive manufacturing process.

Figure 6:
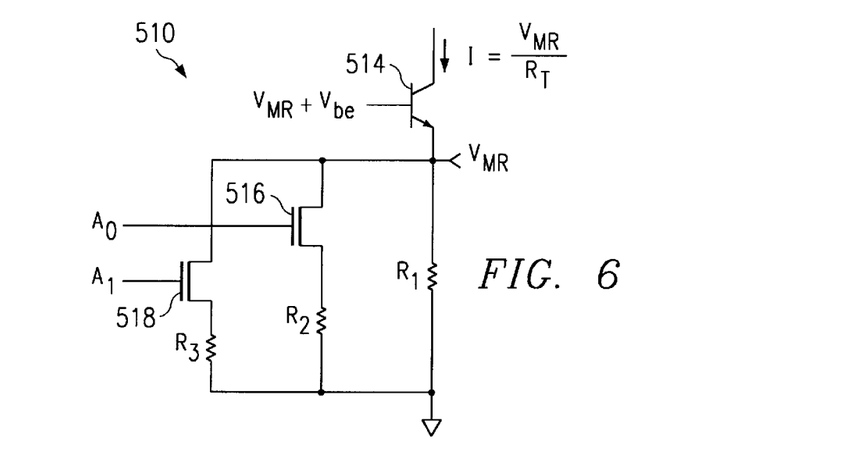
FIG. 6 is a block diagram illustrating an adjustable sensitivity circuit which can be used in conjunction with FIG. 5.

FIG. 6 represents an adjustable sensitivity circuit 510 according to another embodiment of the present invention. The circuit 510 is a current source having a current value of $V_{MR}/R_T$. The circuit includes a transistor 514 with a base voltage of $V_{MR}$, the detected head voltage, and an adjustable emitter resistance $R_T$. The emitter resistance includes multiple resistors that are in parallel when selected by select transistors. In the illustrated embodiment, a resistor R1 is connected to the transistor's 514 emitter. Additional resistors R2 and R3 are selectively added in parallel to R1 by asserting inputs A0 and A1 to select transistors 516, 518. The parallel combination of selected resistors results in a total resistance $R_T$. The select inputs A0, A1 are preferably outputs of a defined pre-amp status register bit as described above. Other embodiments could include any number of resistors in parallel.

Figure 7:
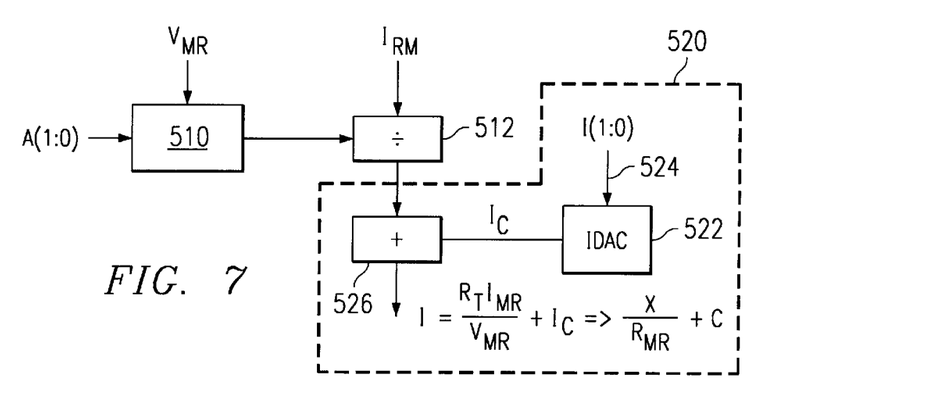
FIG. 7 is a block diagram illustrating a selectable peak control circuit.

FIG. 7 represents a schematic incorporating a peak control circuit according to another embodiment of the present invention. In FIG. 7, a peak control circuit 520 is used in combination with the adjustable sensitivity circuit 500 described above. The peak control circuit could be used alone, without the adjustable sensitivity circuit. The peak control circuit 520 adds a selectable amount of additional current boost to the output of the adjustable sensitivity circuit. The amount of peaking in the frequency response allows the disk drive parameters to be optimized by having a programmable current boost to increase the frequency response at the pole irrespective to changes in head resistance $R_{MR}$.

The peak control circuit shown in FIG. 7 represents includes a current source 522 which is controlled by a digital input 524. The digital input is preferably from additional defined bits in the pre-amp status register. The controlled current source 522 can be implemented with any conventional method for creating a controlled current from a digital input. The selectable current is then supplied to the current source 220 in the variable impedance load. 126 of the adjustable impedance boosting circuit 110. The selectable current is added to the current from the adjustable sensitivity circuit 510, if it is to be used in combination with that circuit, at the addition block or junction point 526 shown in FIG. 7. The adjustable peak current circuit 520 can be used independently of the adjustable sensitivity circuit. In such an embodiment, block 510 of FIG. 7 would be a fixed coefficient as described in the prior art.

Figure 8:
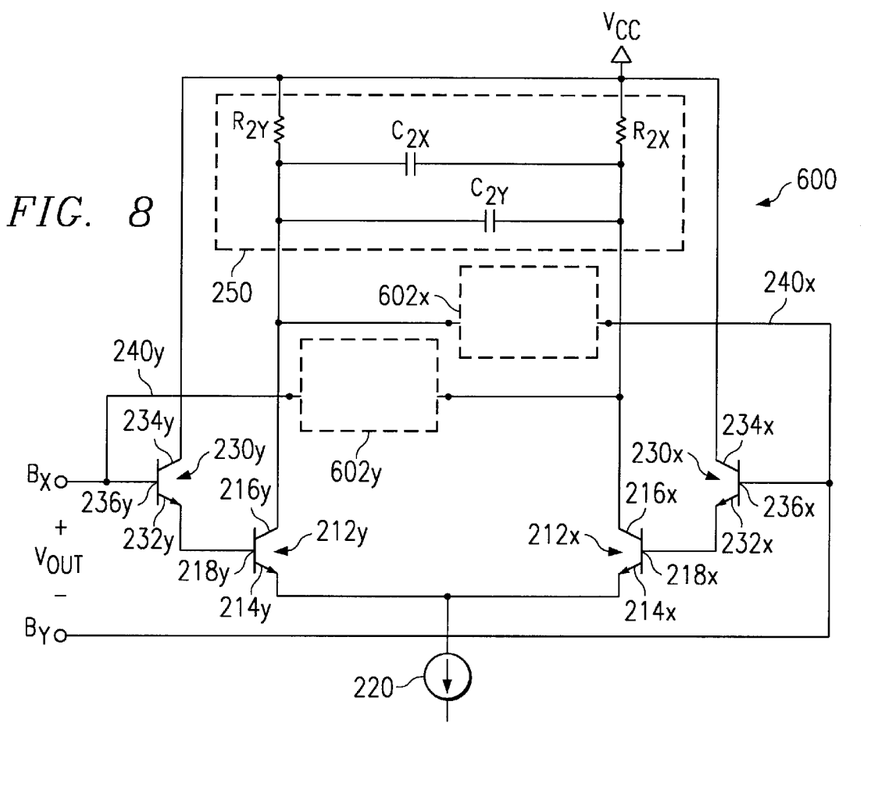
FIG. 8 is a schematic diagram of a variable impedance load circuit with an adjustable zero frequency circuit.

FIG. 8 represents an adjustable frequency circuit 600 according to another embodiment of the present invention. FIG. 8 represents a variable impedance load, which replaces the variable impedance load 126 in the prior art circuit of FIG. 2. In this embodiment, the circuit architecture is the same as shown in the prior art circuit of FIG. 3 except that blocks 242x and 242y have been modified and are now referenced as 602x and 602y. Thus, the general description and operation of FIG. 8 is the same as that described for FIG. 3 above, but with the changes to these blocks as described below. Blocks 602x and 602y are adjustable frequency circuits that allow the circuit to be tuned to a frequency by selecting particular bits in the pre-amp status register. Thus the frequency of the zero can be adjusted through the status register. The advantage of this improvement is it allows the frequency location of the input pole compensation to be adjusted to maximize the drive frequency response characteristics.

Figure 9:
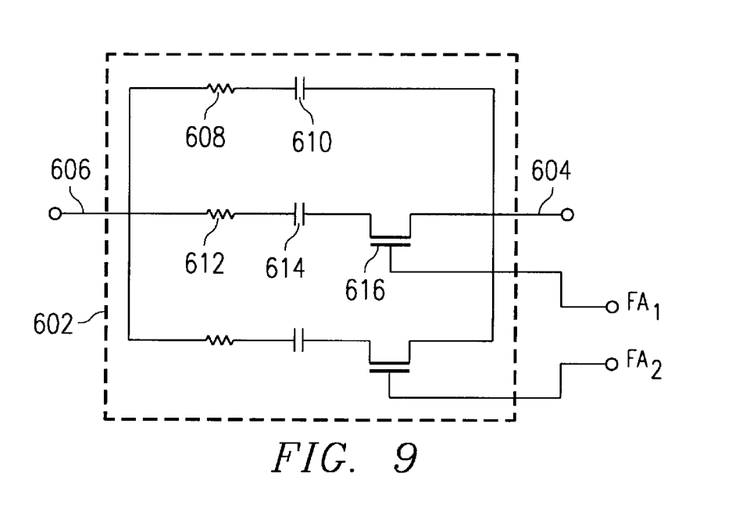
FIG. 9 is a schematic diagram of an adjustable zero frequency circuit.

FIG. 9 represents an adjustable frequency circuit 602 according to another embodiment of the present invention. The adjustable frequency circuit 602 is substituted for blocks 602x and 602y in FIG. 8. The connections 604 and 606 are connected as shown in FIG. 8 between the collector of transistor 216 on one side and the gate of transistor 234 on the other. The adjustable frequency circuit 602 contains a resistor 608 in series with a capacitor 610 as in the prior art, and one or more additional circuits enabled by a bit from the pre-amp status register to selectively adjust the basic frequency of the zero. This zero is then further adjusted as described above in response to the variable impedance of the disk head. This improvement over the prior art, the adjustable zero frequency, can be used in combination with the other selectable features described above. Those selectable features are concerned with modifying the current of current source 220. Therefore, the current of current source 220 could take any form as described above.

In the embodiment of FIG. 9 the additional circuits include a resistor 612 and a capacitor 614 in series with a switch 616. The switch 616 has a frequency adjust input $FA_1$, which can be enabled from the pre-amp for selectively adjusting the pole frequency. One or more additional sets of resistors, capacitors and switches can be added to further adjust the pole frequency. In the illustrated embodiment, there is one additional set shown with a switch input of $FA_2$. The component values of the resistors and capacitors can be the same or scaled to provide a wide range of possible pole frequencies.

Figure 10:
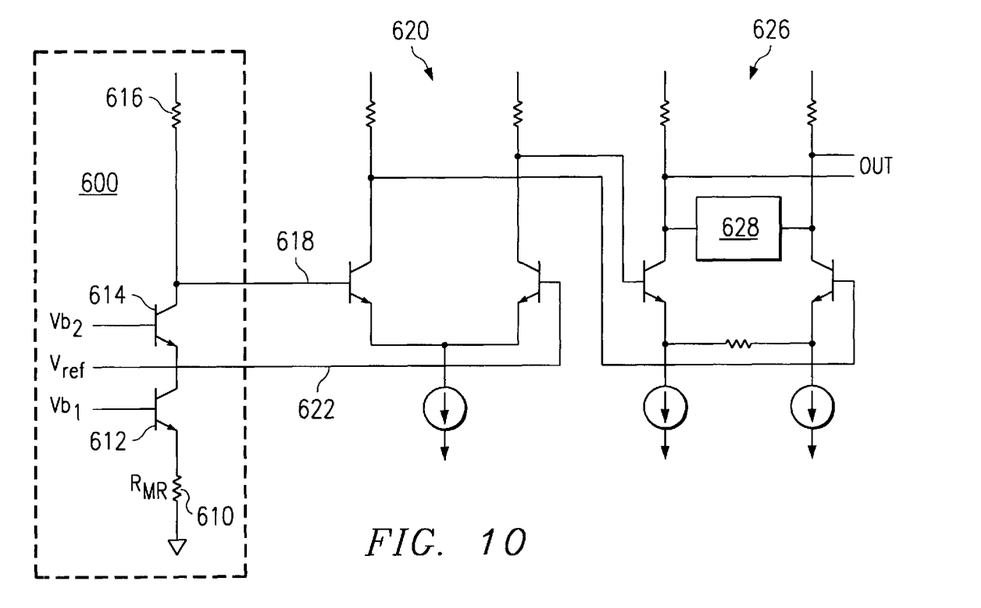
FIG. 10 is a schematic diagram of a head pre-amp circuit with three gain stages, with the third gain stage having a selectively adjustable pole compensation circuit.

FIG. 10 represents another embodiment of the present invention. This embodiment uses an input stage circuit 600 having a non-differential or pseudo-differential circuit. This simplified input stage circuit 600 is well known in the prior art. The circuit 600 contains the head 610 shown as resistance $R_{MR}$. The bias current for the head 610 is typically set up by two cascaded transistors 612, 614 and resistor 616. The base of transistor 612 has a first bias voltage $V_{b1}$ and transistor 614 has a second bias voltage $V_{b2}$. The bias voltages may be controlled by the pre-amp status register and may compensate for temperature or other circuit characteristics.

The output 618 of pre-amp head circuit 600 is typically coupled to one or more gain stages, with 3 stages being common. In the embodiment illustrated in FIG. 10, the output 618 is connected to one side of the first gain stage 620, and a reference voltage Vref 622 is connected to the opposing side of the gain stage 620. The output of the first gains stage 620 is shown connected to a second gain stage 624. In the preferred embodiment, a third gain stage 626 is coupled to the second gain stage 620. This embodiment puts the variable impedance load 628 across the output in the third gain stage 628. The location here has advantages over the prior art circuit of FIG. 2. However, the variable impedance load shown in FIG. 8 is not readily compatible with the circuit of FIG. 10 because of insufficient head room and input swing handling capability.

Figure 11:
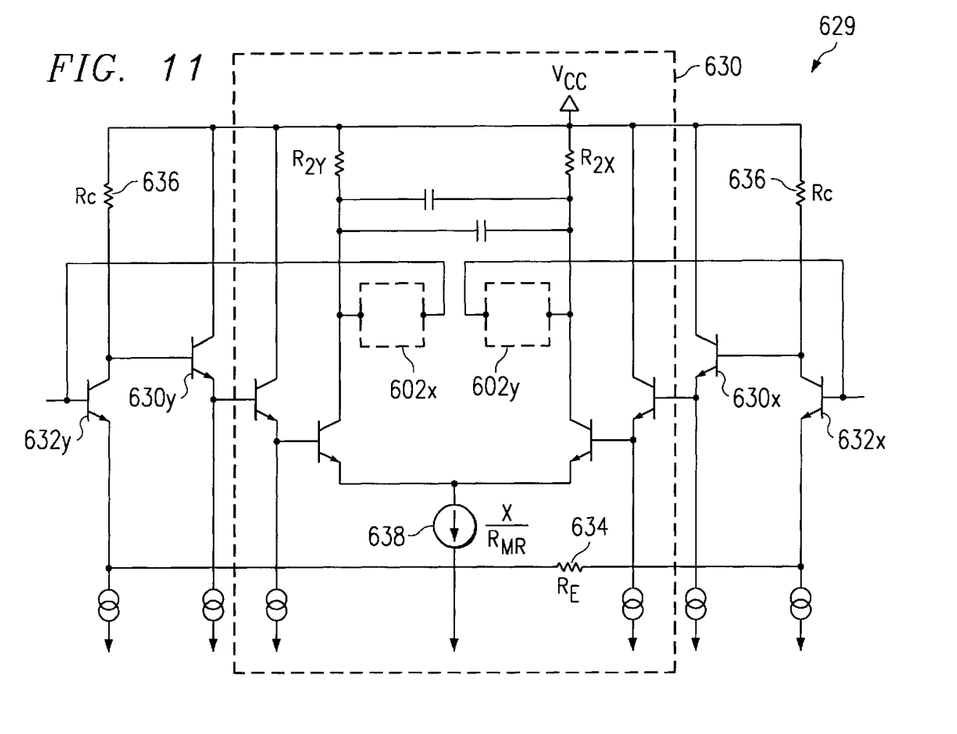
FIG. 11 is a schematic diagram of a selectively adjustable pole compensation circuit with level shifting and emitter degeneration to enable use in subsequent gain stages from the first gain stage.

A modified variable and controllable impedance circuit 628 with sufficient input swing handling capability and head room is illustrated in FIG. 11 according to another embodiment of the present invention. This circuit contains the basic architecture of the impedance circuit of FIG. 8 in the box shown at 630. The basic architecture of circuit 630 includes the frequency circuits 602x and 602y as described above. The circuit of boxes 602x and 602y can be fixed frequency as in the prior art, or adjustable frequency circuits as described with reference to FIG. 9. A difference being these adjustable frequency circuits may be connected back to the circuit inputs in contrast to the method described above.

The modified variable and controllable impedance circuit 628 achieves increased head room by adding a level shift stage on each side with transistors 630x and 630y. Further the modified variable and controllable impedance circuit 628 achieves increased voltage swing by emitter degeneration with transistors 632x and 632y, resistor $R_E$ 634 coupled between the input resistors, and resistors $R_C$ 636x, 636y.

Further embodiments of the present invention are achieved by combining the improvements of the above embodiments with the circuit described in FIG. 10 incorporating the circuit of FIG. 11. Namely, any or all of the circuits of FIGS. 5, 6, and 7 can be added to the current source 638 of this embodiment to achieve the benefits described above with reference to those circuits.

Although the present invention has been described in detail it should be understood that various changes and substitutions may be made hereto without departing from the scope of the present invention as defined by the appended claims.

What is claimed is:

1. A selectively adjustable impedance boosting circuit, comprising:

a gain stage;

a magneto-resistive element coupled to the gain stage;

a variable impedance load circuit coupled in parallel with the gain stage, the variable impedance load circuit operable to adjust the impedance of the boosting circuit in proportion to the resistance of the magneto-resistive element; and an impedance-controlling circuit element in the variable impedance load with a selectable factor to provide a further selectable adjustment to the frequency response of the variable impedance load circuit.

2. The circuit of claim 1, wherein impedance-controlling circuit element comprises:

a current source operable to generate a current signal that is proportional to the resistance of the magneto-resistive element and has a selectable sensitivity to the resistance of the magneto-resistive element; and a positive feedback network operable to receive the current signal from the impedance-controlling current source and provide a negative value of the impedance of the variable impedance load.

3. The circuit of claim 1, wherein impedance-controlling circuit element comprises:

a current source operable to generate a current signal that is proportional to the resistance of the magneto-resistive element and has a selectable peak control of the zero response, where the selectable control is through the pre-amp status register; and a positive feedback network operable to receive the current signal from the impedance-controlling current source and provide a negative value of the impedance of the variable impedance load.

4. The circuit of claim 1, wherein impedance-controlling circuit element comprises:

a current source operable to generate a current signal that is proportional to the resistance of the magneto-resistive element and has a selectable zero frequency response, where the selection of the zero frequency is made through the pre-amp status register; and a positive feedback network operable to receive the current signal from the impedance-controlling current source and provide a negative value of the impedance of the variable impedance load.

5. The circuit of claim 3, wherein the variable impedance load comprises:
   a first differential pair of transistors, each having its emitter coupled to the impedance-controlling current source;
   a second differential pair of transistors, each having its emitter coupled to the base of one of the transistors of the first differential pair;
   a first positive feedback element coupled between the base of one of the transistors of the first pair and the collector of one of the transistors of the second pair;
   a second positive feedback element coupled between the base of the other transistor of the first pair and the collector of the other transistor of the second pair.

6. A disk drive-comprising:
   a read head operable to interface with a storage device; and
   a preamplifier circuit coupled to the read head, the preamplifier circuit including an selectively adjustable impedance boosting circuit, comprising:
   a gain stage;
   a magneto-resistive element coupled to the gain stage;
   a variable impedance load circuit coupled in parallel with the, gain stage, the variable impedance load circuit operable to adjust the impedance of the boosting circuit in proportion to the resistance of the magneto-resistive element; and
   an impedance-controlling circuit element in the variable impedance load with a selectable factor to provide a further selectable adjustment to the frequency response of the variable impedance load circuit.

7. The disk drive of claim 6, wherein impedance-controlling circuit element comprises:
   a current source operable to generate a current signal that is proportional to the resistance of the magneto-resistive element and has a selectable sensitivity to the resistance of the magneto-resistive element; and
   a positive feedback network operable to receive the current signal from the impedance-controlling current source and provide a negative value of the impedance of the variable impedance load.

8. The disk drive of claim 7, wherein impedance-controlling circuit element comprises:
   a current source operable to generate a current signal that is proportional to the resistance of the magneto-resistive element and has a selectable peak control of the zero response, where the selectable control is through the pre-amp status register; and
   a positive feedback network operable to receive the current signal from the impedance-controlling current source and provide a negative value of the impedance of the variable impedance load.

9. The disk drive of claim 7, wherein impedance-controlling circuit element comprises:
   a current source operable to generate a current signal that is proportional to the resistance of the magneto-resistive element and has a selectable zero frequency response, where the selection of the zero frequency is made through the pre-amp status register; and
   a positive feedback network operable to receive the current signal from the impedance-controlling current source and provide a negative value of the impedance of the variable impedance load.

10. The disk drive of claim 7, wherein the variable impedance load comprises:
    a first differential pair of transistors, each having its emitter coupled to the impedance-controlling current source;
    a second differential pair of transistors, each having its emitter coupled to the base of one of the transistors of the first differential pair;
    a first positive feedback element coupled between the base of one of the transistors of the first pair and the collector of one of the transistors of the second pair;
    a second positive feedback element coupled between the base of the other transistor of the first pair and the collector of the other transistor of the second pair.

11. A method of increasing the bandwidth of a differential amplifier, comprising:
    approximating a zero in the frequency response of the differential amplifier near the frequency of a pole caused by lead inductance of a magneto-resistive element coupled between the emitters of a differential pair of gain stage transistors;
    determining an actual value of the resistance of the magneto-resistive element;
    selecting a circuit parameter through a pre-amp status register; and
    adjusting the impedance of a variable impedance load in proportion to the actual value of the resistance of the magneto-resistive element and adjusting the impedance of the variable impedance load based on the selected circuit parameter, the variable impedance load coupled in parallel with at least a portion of a collector load of the differential amplifier.

12. The method of claim 11, wherein adjusting the impedance of a variable impedance load comprises:
    receiving at a positive feedback network of the variable impedance load, a current signal that is proportional to the actual value of the resistance of the magneto-resistive element;
    selecting through the pre-amp serial status register a sensitivity to the current signal that is proportional to the resistance of the magneto-resistive element such that the proportion factor is selected for the current signal; and
    positively feeding back at least a portion of the current signal to create a negative impedance coupled in parallel with the collector load.

13. The method of claim 11, wherein impedance-controlling circuit element comprises:
    a current source operable to generate a current signal that is proportional to the resistance of the magneto-resistive element and has a selectable peak control of the zero response, where the selectable control is through the pre-amp status register; and
    a positive feedback network operable to receive the current signal from the imedance-controlling current source and provide a negative value of the impedance of the variable impedance load.

14. The method of claim 11, wherein impedance-controlling circuit element comprises:
    a current source operable to generate a current signal that is proportional to the resistance of the magneto-resistive element and has a selectable zero frequency response, where the selection of the zero frequency is made through the pre-amp status register; and
    a positive feedback network operable to receive the current signal from the impedance-controlling current source and provide a negative value of the impedance of the variable impedance load.

* * * * *